United States Patent
Pitman

(10) Patent No.: US 8,865,041 B2
(45) Date of Patent: Oct. 21, 2014

(54) EXTRUDER AND PROCESS FOR EXTRUDING A POLYMER

(75) Inventor: Gary Lindsay Pitman, Stirling (GB)

(73) Assignee: Ineos Sales (UK) Limited, Hampshire (GB)

(*) Notice: Subject to any disclaimer, the term of this patent is extended or adjusted under 35 U.S.C. 154(b) by 684 days.

(21) Appl. No.: 12/736,147

(22) PCT Filed: Mar. 18, 2009

(86) PCT No.: PCT/EP2009/053204
§ 371 (c)(1), (2), (4) Date: Sep. 15, 2010

(87) PCT Pub. No.: WO2009/121721
PCT Pub. Date: Oct. 8, 2009

(65) Prior Publication Data
US 2011/0001261 A1 Jan. 6, 2011

(30) Foreign Application Priority Data

Mar. 31, 2008 (EP) .................................. 08103227

(51) Int. Cl.
| | | |
|---|---|---|
| *B29C 47/58* | (2006.01) | |
| *B29C 47/60* | (2006.01) | |
| *B29C 47/38* | (2006.01) | |
| *B29C 47/66* | (2006.01) | |
| *B29C 47/00* | (2006.01) | |
| *B29C 47/10* | (2006.01) | |

(52) U.S. Cl.
CPC ............. *B29C 47/66* (2013.01); *B29C 47/6075* (2013.01); *B29C 47/385* (2013.01); *B29C 47/0009* (2013.01); *B29C 47/1027* (2013.01); *B29C 47/1009* (2013.01)
USPC ................... 264/211.23; 264/176.1; 425/113; 366/76.1; 366/76.9; 366/76.93; 366/182.1

(58) Field of Classification Search
None
See application file for complete search history.

(56) References Cited

U.S. PATENT DOCUMENTS

| | | |
|---|---|---|
| 3,082,816 A | 3/1963 | Skidmore |
| 4,678,339 A | 7/1987 | Peiffer et al. |

(Continued)

FOREIGN PATENT DOCUMENTS

| | | |
|---|---|---|
| DE | 28 42 162 A1 | 4/1980 |
| JP | 06-031725 A | 2/1994 |

(Continued)

OTHER PUBLICATIONS

Giles, Harold F. Jr.; Wagner, John R. Jr.; Mount, Eldridge, M. III (2005). Extrusion—The Definitive Processing Guide and Handbook.. William Andrew Publishing/Plastics Design Library, pp. 53-63.*

(Continued)

*Primary Examiner* — Jeffrey Wollschlager
(74) *Attorney, Agent, or Firm* — Nixon & Vanderhye P.C.

(57) ABSTRACT

Process for extrusion of polymer by feeding a polymer feedstock to the feed port of an extruder having (i) two or more barrel sections arranged sequentially from (a) an upstream feed barrel section to which polymer feedstock to be extruded is fed, the upstream feed barrel section containing two screws each having a diameter of X, to (b) a downstream barrel section from which melted polymer is passed to a die and extruded, and (ii) a feed port for feeding polymer feedstock to be extruded into the extruder at its upstream end. The polymer feedstock is in the form of a powder, and the feed port area is a rectangular shape with width limited by the width of the upstream feed barrel section to 2*X and with a length greater than 2.5*X. The total area of the feed ports through which polymer feedstock is introduced is greater than $5*X^2$.

7 Claims, 1 Drawing Sheet

(56) References Cited

U.S. PATENT DOCUMENTS

| | | |
|---|---|---|
| 5,594,074 A | 1/1997 | Hwo et al. |
| 5,824,709 A * | 10/1998 | Suka ............... 521/47 |
| 5,988,865 A | 11/1999 | Bacher et al. |
| 6,355,194 B1 | 3/2002 | Agur et al. |
| 6,562,192 B1 | 5/2003 | Hamilton et al. |
| 7,275,703 B2 | 10/2007 | Bacher et al. |
| 6,328,919 B1 * | 12/2011 | Pham et al. ............. 428/36.9 |
| 2002/0060378 A1 * | 5/2002 | Miyamoto et al. ......... 264/211 |
| 2002/0192891 A1 | 12/2002 | Takata et al. |
| 2004/0204551 A1 * | 10/2004 | Czaplicki et al. ........... 525/524 |
| 2005/0089595 A1 | 4/2005 | Blach |
| 2007/0007375 A1 * | 1/2007 | Bacher et al. ........... 241/199.12 |
| 2007/0222105 A1 | 9/2007 | Brown |

FOREIGN PATENT DOCUMENTS

| | | |
|---|---|---|
| JP | 2006-103139 A | 4/2006 |
| JP | 2006-199913 A | 8/2006 |

OTHER PUBLICATIONS

Translation of drawings of D1 (JP 06-31725 A) Figs. 1-3 (1 pg).
Machine translation of JP H06-031725 A (D1) (4 pgs).
Translation of drawings of D2 (JP 2006-103139 A) Figs. 1-4 (1 pg).
Machine translation of JP 2006-103139 A (D2) (13 pgs).

\* cited by examiner

EXTRUDER AND PROCESS FOR EXTRUDING A POLYMER

This application is the U.S. national phase of International Application No. PCT/EP2009/053204 filed 18 Mar. 2009 which designated the U.S. and claims priority to European Application No. 08103227.8 filed 31 Mar. 2008, the entire contents of each of which are hereby incorporated by reference.

The present invention relates to an extruder for a polymer, and a process for extruding a polymer using said extruder.

BACKGROUND OF THE INVENTION

The extrusion of polymer is a common processing step in polymer production. In general, polymer powder may be metered at a desired rate in to a feed hopper, then passed by gravity from said feed hopper through what is known as a feed port and into an extruder barrel in which there are rotating screws. The screws rotate to move the polymer away from the feed port along the barrel. Thermal and mechanical energy (from the screw) are provided to the polymer powder in the barrel causing it to melt. Once melted the polymer is passed into a suitable die and extruded to form polymer in the desired extruded form, such as pellets or film.

In industrial scale extrusion processes typical extruders are made up of barrel sections having a "standard" barrel length. Typically the overall length of a standard barrel section is 2 to 3 times the diameter of the screw or rotor. Conventionally, at industrial scale polymer is fed into the first barrel section in a sequence, with at least a second barrel section being provided "downstream". At least a third barrel section is also common to ensure polymer is completely melted prior to extrusion. There are a number of parameters which are important in the extrusion process, including, for example, barrel dimensions, screw speed, screw pitch and torque. The general direction in the art has been to increase extrusion throughput, which has involved increasing all linear dimensions of the barrel, the screw speed and the torque as much as possible since these have, to date, been the limiting factors.

The principal requirement of the feeding of the polymer has been to sufficiently fill the barrel as the polymer is moved along it. The polymer is fed to the first barrel section, usually from a hopper, through an area known as the feed port. It is typical that the feed port width is maximised based on the barrel section width i.e. up to the extremity of the screws, for example up to 2 times the diameter of the screws or rotors in the case of twin screw or twin rotor extruders.

Typically, the feed port also has an axial length of up to 2 times the diameter of the screw or rotor in this section of the extruder, giving a feed port area with length and width both up to 2 times the screw diameter.

The feed rate of the polymer powder for twin-screw extruders is generally controlled by the rate at which the powder is metered into the hopper. The hopper is generally considered to run "empty" by which is meant without significant volume of powder therein and without "hold-up" of the powder at the base of the hopper. To date the feed port area has not generally been limiting on the process, and therefore has not caused a great deal of concern.

SUMMARY OF THE INVENTION

However, it has now been found that as capacity increases, and even though the feed port area is generally increased (by proportional increases in its width and length) as the screw and barrel sizes are increased, the feed port area increases only in a squared mathematical relationship whereas the throughput increases in a cubic relationship, and there becomes an issue that the polymer does not feed into the barrel through the feed port at a rate fast enough to fill the barrel sufficiently. This issue is especially significant for feedstocks with poor flowability.

Thus, in order to meet the continued requirements for higher capacity it is necessary to design an extruder which has an increased polymer feed capability compared to prior art extruders.

Thus, in a first aspect the present invention provides an extruder comprising:
(i) two or more barrel sections arranged sequentially from:
  (a) an upstream feed barrel section to which polymer feedstock to be extruded is fed, the upstream feed barrel section containing two or more screws each having a diameter of X; to
  (b) a downstream barrel section from which melted polymer is passed to a die and extruded; and
(ii) one or more feed ports for feeding polymer feedstock to be extruded into the extruder at its upstream end,
characterised in that the total area of the one or more feed ports through which polymer feedstock is introduced is greater than $4*X^2$.

The present invention relates to extruders having multiple (two or more) screws. The screws are provided in parallel (or close thereto) and may rotate in the same or opposite directions in use (known respectively as co-rotating or counter-rotating). The screws may be non-intermeshing, partially intermeshing, or fully intermeshing.

The most common type of extruders having multiple screws, and the preferred extruders of the present invention, are those having two screws. Examples of such extruders are twin-screw extruders and twin rotor mixer extruders. It is noted that the terms "screw" and "rotor" are widely used in the extruder industry, often apparently interchangeably. As used herein, the term "screw" is meant to include both such screws and rotors, and where reference to a "twin-screw extruder" is made, and unless otherwise defined, it should also be read as also referring to twin rotor extruders.

Preferably, the extruder comprises three of more barrel sections.

For avoidance of doubt, although it is the diameter of the two or more screws in the upstream feed barrel section that is important in the process of the present invention, each barrel section will contain a corresponding two or more screw sections in communication with the two or more screws in the upstream feed barrel section.

The present invention is characterised in that the total area of the one or more feed ports through which polymer feedstock is introduced is greater than $4*X^2$, where X is the diameter of the screws in the upstream feed barrel section.

In one embodiment, the object of the present invention may be achieved by adding a second feed port downstream of the first feed port, or even multiple feed ports downstream of the first feed port, such that the combined area of the ports is greater than $4*X^2$.

However, it is generally preferred that a single feed port is used which has an area of greater than $4*X^2$.

Preferably, the total area of the one or more feed ports through which polymer is introduced is greater than $5*X^2$, and most preferably greater than $6*X^2$.

Although other shapes may in theory be used, for maximum area per unit length and for simplicity of design and manufacture, the feed port area will generally be a rectangular shape with width limited by the width of the upstream feed barrel section i.e. $2*X$. The rectangular shape is preferably a rectangle with rounded corners, since angled corners are more prone to powder sticking therein.

It will be apparent that, to obtain the above areas for the feed port, the length of the feed port may be greater than the length of a so-called "standard" barrel.

Thus, the feed port length will be greater than 2*X, preferably greater than 2.5*X and more preferably greater than 3*X.

It is possible to use an extended or "non-standard" barrel having an increased length for the upstream feed barrel section. Alternatively, the length/area of the feed port may extend the feed port onto a second downstream barrel section such that at least part of it feeds polymer directly into the second barrel section. For example, the extruder may comprise three of more barrel sections each having a length, L, and the feed port has a length of greater than L.

Another important parameter in the process of the present invention is the screw pitch. The screw pitch is the distance between the adjacent points at which the screw helix returns to the same radial position on the screw. For avoidance of doubt, where the screw comprises more than one helix, the screw pitch as used herein is the distance where an individual screw helix returns to the same radial position, which will be greater than the distance between adjacent helixes. The pitch is also shown schematically in FIG. 2. The ratio of screw pitch to screw diameter within the upstream feed barrel section is suitably at least 1 and no greater than 2.5.

The use of a longer screw pitch can increase the extruder throughput. However, without the use of an enlarged feed port according to the process of the present invention it has been found that as scale increases this results in the channels in the screw being only partially filled, so that any further increase in pitch, or an increase in speed, will not give an increase in throughput. In addition in the case of long pitch screws the forward conveying efficiency of the polymer feedstock will decrease.

In a second aspect, the present invention provides a process for extrusion of polymer comprising feeding a polymer feedstock to the feed port of an extruder as described herein.

The polymer feedstock is typically provided in the form of powder or pellets. The polymer feedstock of the present invention is preferably a polymer of ethylene or propylene, either homopolymers thereof or copolymers thereof with another comonomer.

The present invention applies particularly to relatively high capacity extrusion processes and relatively large extruder dimensions. Typically the present invention applies to extruders with each screw having a screw diameter of 200 mm or greater in the upstream feed barrel section.

Whilst the extruder and process of the present invention may be used with any polymer powder, even those that are generally considered as "free-flowing" or "easy-flowing", the present invention applies particularly to polymer powders with relatively poor flow properties.

Powder flow properties are typically characterised by testing in a shear cell. An example of such a test is described in ASTM D 6773-02 "Standard Shear Test Method for Bulk Solids Using the Schulze Ring Shear Tester". As described in ASTM D 6773-02, the flow function of a polymer powder is a plot of the unconfined yield strength of the powder versus major consolidation stress. In general, polymers are rated in their flowability in terms of the flowability ratio, $ff_c$, which is defined as the ratio of the consolidation stress to the unconfined yield strength, as follows:

$ff_c$<1 non-flowing
1<$ff_c$<2 very cohesive (to non-flowing)
2<$ff_c$<4 cohesive
4<$ff_c$<10 easy-flowing
10<$ff_c$ free-flowing.

The present invention is particularly applicable to polymer powders with a value of ffc less than 4, although it may also be useful even for polymer powders with values above 4.

Preferably, therefore, the polymer powder to be extruded in the process of the present invention has a flowability ratio of less than 6. More preferably, the polymer powder to be extruded in the process of the present invention has a flowability ratio of less than 4, and most preferably has a flowability ratio of less than 2. Preferably, the polymer powder to be extruded in the process of the present invention has a flowability ratio of at least 1. It should be noted that the flowability ratio of a polymer powder may change as a function of the consolidation pressure and also of temperature. As used herein, the flowability ratio of the polymer powder is the value measured using the instantaneous shear test described in ASTM D 6773-02 at a consolidation pressure of 2000 Pa and at a temperature that is equal to the temperature of the polymer powder at the feed port during the extrusion process to which it is to be fed. For example, for a polyethylene powder that is to be extruded and wherein the temperature of the polyethylene powder at the feed port of the extruder is 65° C., the flowability ratio of the polyethylene powder should be measured at a temperature of 65° C.

BRIEF DESCRIPTION OF THE DRAWINGS

The invention is further described with reference to the accompanying drawings, in which.

DETAILED DESCRIPTION OF THE INVENTION

Figure 1:
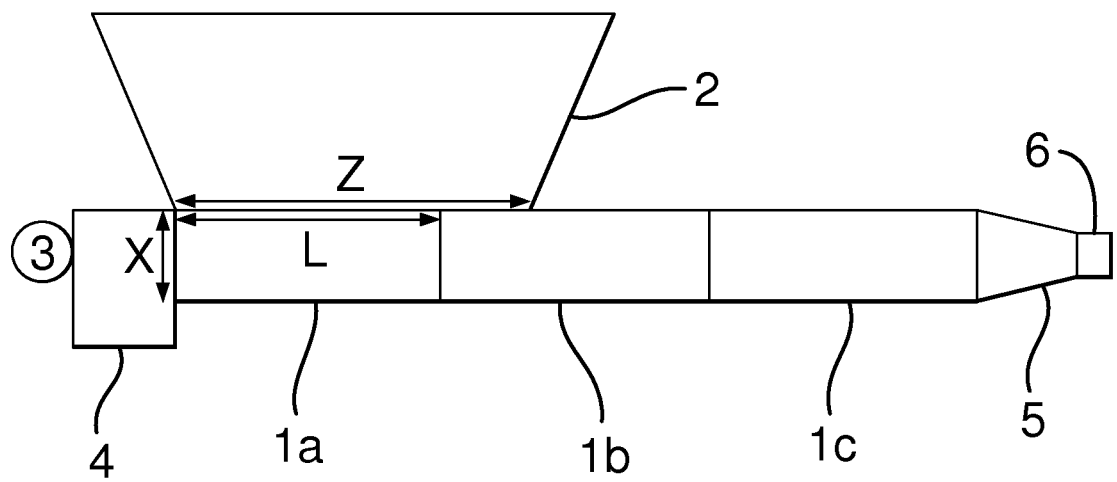
FIG. 1 shows in schematic form an extruder in accordance with the present invention.

An extruder according to the present invention is shown schematically in FIG. 1. In particular, FIG. 1 shows an extruder having three barrel sections, denoted 1a (upstream feed barrel section), 1b (second barrel section) and 1c (downstream barrel section), each having a length, L. The barrels contain two non-intermeshing screws of diameter X (not shown in FIG. 1, but shown in FIG. 2). (The internal height of each barrel is a fraction greater than X necessary to contain the screws and allow the rotation of the screw during operation. For the same reason, the internal width of each barrel is a fraction greater than 2*X.) In the Figure the length L is approximately 2.5*X. To feed polymer into the extruder there is provided a hopper, 2, with a feed port the area of which is at least 4*X². (As shown the feed port has an axial length, Z, which is approximately 3*X, corresponding to an area of approximately 6*X².) Also shown schematically in FIG. 1 are a screw motor, 3, extruder gear box, 4, a transition piece, 5, and a die, 6.

Figure 2:
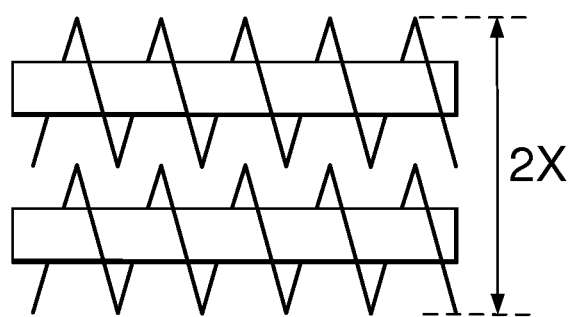
FIG. 2 shows in schematic form a top view of a section of twin-screws of a non-intermeshing twin screw extruder.

FIG. 2 shows in schematic form a top view of a section of twin-screws of a non-intermeshing twin screw extruder. In this case the width is 2*X. (Intermeshing or partially intermeshing would have a lower width related to the extent of intermeshing.)

The invention claimed is:
1. A process for extrusion of polymer comprising feeding a polymer feedstock to a feed port of an extruder, said extruder comprising:

(i) two or more barrel sections arranged sequentially from:
   (a) an upstream feed barrel section to which polymer feedstock to be extruded is fed, the upstream feed barrel section containing two screws each having a diameter of X; to
   (b) a downstream barrel section from which melted polymer is passed to a die and extruded; and
(ii) the feed port for feeding polymer feedstock to be extruded into the extruder at its upstream end, wherein (a) the polymer feedstock is a polymer of ethylene or propylene and is in the form of a powder having a flowability ratio of from at least 1 to less than 6, said flowability ratio of the polymer powder being measured using the instantaneous shear test described in ASTM D 6773-02 at a consolidation pressure of 2000 Pa and at a temperature that is equal to the temperature of the polymer powder at the feed port during the extrusion process, (b) the diameter of the screws in the feed port barrel section of extruder is 200 mm or greater, and (c) the feed port area is a rectangular shape with width limited by the width of the upstream feed barrel section to up to $2*X$ and with a length greater than $2.5*X$ and the total area of the feed port through which polymer feedstock is introduced is greater than $5*X^2$.

2. A process according to claim 1 wherein the polymer feedstock has a flowability ratio of less than 4.

3. A process according to claim 1 wherein the extruder comprises three or more barrel sections.

4. A process according to claim 1 wherein the extruder has a single feed port which has an area greater than $5*X^2$.

5. A process according to claim 1 wherein the total area of feed ports through which polymer is introduced is greater than $6*X^2$.

6. A process according to claim 1 wherein the ratio of the screw pitch to screw diameter within the upstream feed barrel section of the extruder is at least 1 and no greater than 2.5.

7. A process according to claim 2 wherein the polymer feedstock has a flowability ratio of less than 2.

* * * * *